United States Patent [19] [11] 4,310,315
Frank et al. [45] Jan. 12, 1982

[54] TACTILE LEARNING DEVICE FOR THE HANDICAPPED

[75] Inventors: Daniel G. Frank, Thousand Oaks; Jack Schaefer, Brea; Richard L. Zweig, Huntington Beach, all of Calif.

[73] Assignee: Therapeople, Inc., Whittier, Calif.

[21] Appl. No.: 37,809

[22] Filed: May 10, 1979

Related U.S. Application Data

[63] Continuation-in-part of Ser. No. 935,128, Aug. 21, 1978, abandoned.

[51] Int. Cl.³ .............................................. G09B 21/00
[52] U.S. Cl. ..................................... 434/114; 434/319
[58] Field of Search ............ 35/8 R, 8 A, 35 R, 35 A, 35/35 C; 273/DIG. 27; 340/407; 128/32, 33, 36, 41, 42; 336/40, 130, 219; 179/107 R, 107 BC; 401/34; 434/113–116

[56] References Cited

U.S. PATENT DOCUMENTS

| Re. 19,808 | 1/1936 | Kranz | 179/107 BC |
|---|---|---|---|
| 667,968 | 2/1901 | Call | 401/34 |
| 722,160 | 3/1903 | Steiger | 401/34 |
| 1,077,096 | 10/1913 | Rosenberg | 128/4 |
| 2,259,565 | 10/1941 | Hutcheson | 128/41 UX |
| 2,273,078 | 2/1942 | Wright | 179/107 BC |
| 2,315,996 | 4/1943 | Workman | 401/34 |
| 3,358,390 | 12/1967 | Korn | 35/35 C |
| 3,368,551 | 2/1968 | Hardyck | 35/35 C |
| 3,416,241 | 12/1968 | Weitzner | 35/35 C |
| 3,453,749 | 7/1969 | Snedeker | 35/35 C |
| 3,541,706 | 11/1970 | Shapiro | 35/35 A |
| 3,742,935 | 7/1973 | Baessler | 35/35 C |
| 3,766,311 | 10/1973 | Boll | 35/35 A |
| 3,782,734 | 1/1974 | Krainin | 35/35C |
| 3,984,708 | 10/1976 | Holmlund et al. | 128/41 |
| 4,044,393 | 8/1977 | Budrose | 35/35 C |
| 4,119,811 | 10/1978 | Moricca et al. | 35/35 A |

Primary Examiner—Vance Y. Hum
Attorney, Agent, or Firm—Warren T. Jessup

[57] ABSTRACT

A learning device for people with damage to the cortical areas of the brain and minimal brain disfunction related to learning. It comprises an elongated housing one end of which is provided with a writing instrument and the other end of which is provided with an electromagnetic transducer which, when connected to a sound recording source, such as a cassette player, causes the elongated housing to vibrate mechanically in accordance with the frequency of sound signals. The device, when held against the skull while vibrating, transmits sound to both hemispheres of the brain so as to accomplish auditory perceptual training.

4 Claims, 4 Drawing Figures

TACTILE LEARNING DEVICE FOR THE HANDICAPPED

This is a continuation-in-part of application Ser. No. 935,128, filed Aug. 21, 1978, now abandoned.

The present invention relates generally to learning and auditory perceptual teaching devices, and more particularly to devices which are useful in aiding individuals to learn who have perceptual disabilities that inhibit learning through conventional auditory teaching techniques.

Some individuals, frequently children, have suffered actual damage to certain areas of the brain which are used in the learning process by way of auditory reception. That is, such individuals might not have a defect in the hearing mechanism per se, but rather have a minimal brain disfunction with respect to the learning process as it takes place with regard to audible information.

It has been found that such learning impairment can, at the very least, be partially overcome by impressing the sound information directly through the individual's cranial bone structure and thereby stimulating the entire cranial cavity, making use of direct bone conduction hearing. This appears to counteract said learning impairments and seems to increase the learning and perceiving abilities of perceptually auditorially handicapped persons.

It is an object of the present invention to provide a learning device which can be used for individual learning programs by perceptually handicapped persons.

A further object of the present invention is to provide a learning device as characterized above which is useful in transmitting information through the skull or bone structure of the individual which is of such size, weight and shape to permit it to be used for writing functions as related thereto.

A still further object of the present invention is to provide a learning device as characterized above which comprises a unique transducer for converting electrical sound signals into mechanical movement.

An even still further object of the present invention is to provide a learning device as characterized above which comprises, in a single unit, such transducer, a writing instrument and an indicator light affording visual indication of receipt of audio information.

Another object of the present invention is to provide a learning device as characterized above which is extremely simple, inexpensive to manufacture and rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 4:
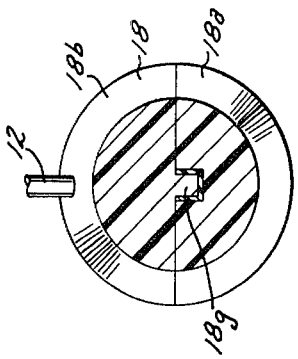
FIG. 4 is a transverse sectional view taken substantially along line 4—4 of FIG. 2 of the drawings.
Figure 3:
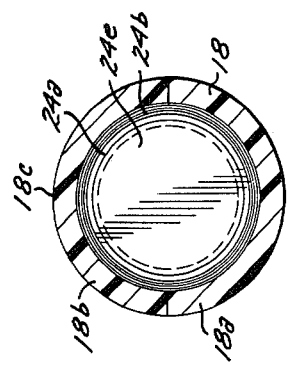
FIG. 3 is a transverse sectional view, taken substantially along line 3—3 of FIG. 2.
Figure 1:
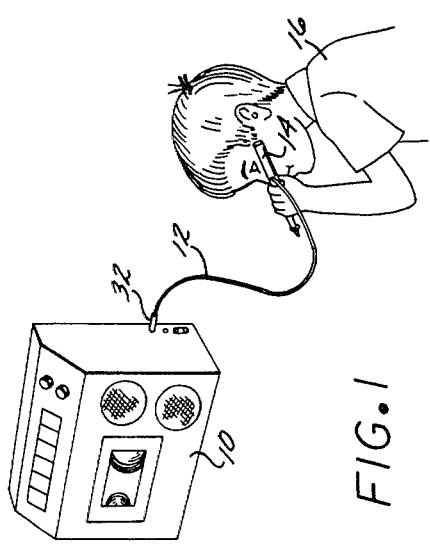
FIG. 1 is a perspective view of the subject device in use.

Referring to FIG. 1 of the drawings, there is shown therein an audio record player 10 which is connected through suitable lead wires 12 to the learning device 14. Such device is shown being used by an individual 16 for the above explained learning process.

Figure 2:
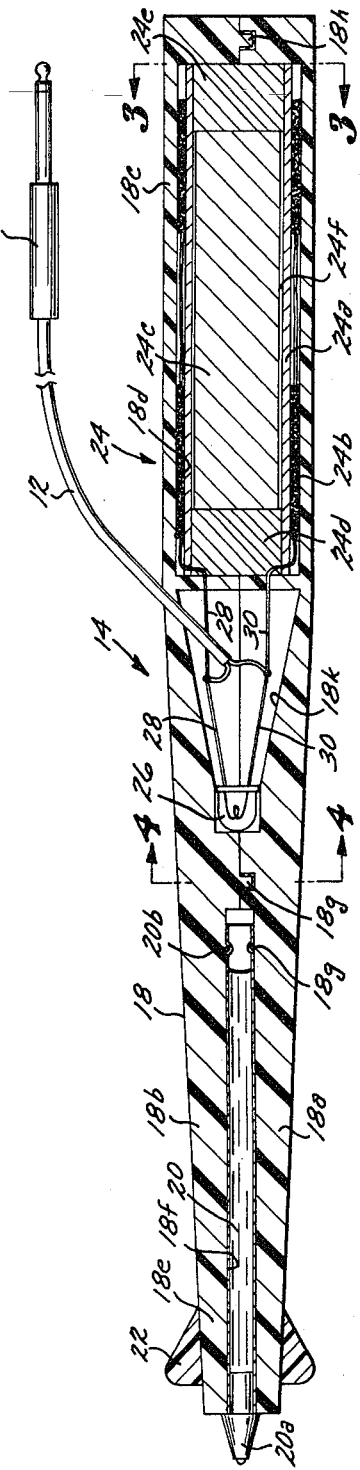
FIG. 2 is a longitudinal sectional view through a learning device according to the present invention.

Referring to FIG. 2 of the drawings, the learning device 14 comprises an elongated housing 18 made in two sections 18a and 18b. Housing 18 is formed of any appropriate translucent material such as any one of various plastics, the translucent nature being essential to afford a visual signal as will hereinafter be explained.

Housing 18 has a first end portion 18c which is formed with a cavity 18d. The other end portion 18e is formed with an opening 18f which is adapted to receive a writing instrument 20 having a writing point 20a. The two sections 18a and 18b of housing 18 are formed separately and are then joined together by suitable plastic bonding means; there being locating tabs 18g and 18h formed in section 18b to properly locate and join together the two sections.

One end of the writing instrument 20 is formed with an annular recess or detent 20b which engages an annular ridge or shoulder 18j formed internally of the opening 18f. Thus, the writing instrument 20, when fully inserted in the end portion 18e of housing 18, is partially compressed by its insertion within the reduced area of the ridge and is firmly held within the opening 18f.

In addition, a plastic band 22 is provided which is bonded onto the tapered end 18e of housing 18 to firmly hold the housing sections 18a and 18b together and to provide means to more securely grip the learning device when used in writing.

Positioned within cavity 18d of housing 18 is a transducer 24 which comprises a non-magnetic cylindrical bobbin 24a on which is wound a plurality of turns of wire affording a single continuours winding 24b.

Within the cylindrical interior of bobbin 24a is a ferro magnetic member 24c which has been provided as a permanent magnet with a north pole at one end and a south pole at the other; and a pair of rubber retainers 24d and 24e at either end. The retainers are slightly compressed within the cylindrical interior surface of bobbin 24a, and between the ends of the magnet 24c and the end walls of the housing cavity 18d. They are formed of closed-cell, foam rubber to keep the magnet 24c properly positioned within the bobbin 24a as well as to function as sealing elements, as will hereinafter become more apparent.

The turns of wire 24b are grouped at each end of the bobbin, and the winding group at one end of the bobbin is reversed from the other end to create a given polarity, e.g. north, in the center of the bobbin 24a, and the opposite polarity, e.g. south, at each end of the bobbin. This arrangement enhances the conversion of the electrical signals into acoustic vibrations.

As shown most particularly in FIG. 2 of the drawings, the exterior diameter of cylindrical magnet 24c is slightly smaller than the internal diameter of bobbin 24a. The space therebetween is filled with a liquid 24f such as oil or a dry lubricant. This lubricant prevents frictional contact of the magnet body with the inner surface of the bobbin and facilitates the movement of the magnet upon receipt of electrical signals and their subsequent conversion into mechanical vibrations as will hereinafter be explained in greater detail.

Housing 18 is further formed with a recess 18k wherein a light-emitting diode 26 is positioned. Lead wires 28 and 30 interconnect winding 24b of transducer 24 and diode 26 and connect them to the lead wires 12. A male connector plug 32 is provided to connect the lead wires 12 to the record player 10, as shown most particularly in FIG. 1 of the drawings.

When it is desired to have an individual experience the learning process, whereby auditory information is transmitted with greater clarity and intensity to the auditory reception and processing areas of the brain, it is merely necessary to insert the connecting plug 32 of the learning device 14 into the appropriate receptacle or jack of an ordinary record player 10. Such player may be a disc player, regular tape player, cassette tape player or the like, the only necessity being that audio signals are provided to the transducer 24 and signal light 26.

Upon receipt of an audio signal at device 14, the winding 24b is suitably energized, thereby creating lines of electromotive force about the permanent magnet 24c. Such lines of force interact with the magnetic lines of force of the permanent magnet to cause the latter to be urged to move in a given longitudinal direction. Thus, the audio information in the form of electrical signals from the player is converted into physical forces on the magnet. However, due to the difference in mass between the unsecured, permanent magnet and the housing and its stationary parts, the force on the permanent magnet is transformed into a longitudinal movement of housing 18. This movement causes compression of one of the rubber retainers. Between signal excursions, the retainers tend to return the magnet to its null position and the device is then ready to receive the next audio excursion.

The frequency characteristics of such electrical signals determine the frequency of the mechanical movement of the housing 18, and the amplitude of such electrical signals determines the magnitude of movement of the housing.

By holding the housing 18 against the individual's skull, the sound information in the form of specific vibrational frequency is thereby transmitted through the entire cranial cavity thereby providing a stimulus which is translated into specific meaningful responses within the brain.

Whenever a sound signal is received by the learning device, the light-emitting diode 26 is energized at the same frequency and amplitude, thereby causing the translucent housing 18 to be lighted accordingly and visually inform the user that information is being transmitted.

In the learning process employing the subject device 14, the information transmitted to the individual normally is in the form of instructions requiring the individual to record certain information on a piece of paper. As such, the writing portion of the instrument is then used to accomplish that objective.

It is thus seen that the present invention provides a learning device for teaching individuals with perceptual impediments in a more efficient way.

Although there have been shown and described certain specific embodiments of the invention, it is to be understood that many modifications thereof are possible. The invention itself is not to be restricted, except insofar as is necessitated by the prior art and by the spirit of the appended claims.

What is claimed is:

1. A learning device for use with a record playing mechanism comprising in combination:
   an elongated housing formed at one end with a cavity and adapted at the other end to receive a writing instrument;
   a writing instrument at said other end of said housing;
   an audio transducer in the cavity at said one end of said housing, comprising:
   a cylindrical stationary electrical winding positioned within and firmly secured to said housing and being wound in reverse directions on each end of a bobbin;
   an unsecured elongate cylindrical permanent magnet member movable relative to said housing and positioned coaxially within said cylindrical winding;
   a retaining member of rubber foam fitted firmly into opposite ends of said bobbin between each end of said magnetic member and said housing to maintain the unsecured magnetic member in a null, centralized position within said winding;
   means for connecting said audio transducer with a record playing mechanism to cause said housing to be vibrated in accordance with the audio signal from said mechanism.

2. A learning device for use with a record playing mechanism according to claim 1, wherein said magnet is formed with an external diameter throughout its length slightly smaller than the interior diameter of said bobbin, and a viscous liquid or dry lubricant is provided between said bobbin and said magnet.

3. A learning device for use with a record playing mechanism according to claim 2, wherein said housing is of translucent material and is formed with a recess and electrical lighting means is mounted in said recess and in circuit with said winding to be energized therewith by said audio signal.

4. A learning device for use with a record playing mechanism according to claim 3, wherein said electrical lighting means is a light-emitting diode.

* * * * *